United States Patent
Strohmeyer, Jr.

(10) Patent No.: US 6,173,508 B1
(45) Date of Patent: Jan. 16, 2001

(54) SEWAGE ORGANIC WASTE COMPACTION AND INCINERATION SYSTEM INTEGRATED OPTIONALLY WITH A GAS TURBINE POWER DRIVER EXHAUST AND/OR OTHER SEPARATE HEAT SOURCE

(76) Inventor: Charles Strohmeyer, Jr., 14 Hessian Blvd., Reading, PA (US) 19607

( * ) Notice: Under 35 U.S.C. 154(b), the term of this patent shall be extended for 0 days.

(21) Appl. No.: 09/206,717

(22) Filed: Dec. 7, 1998

Related U.S. Application Data

(63) Continuation-in-part of application No. 09/093,029, filed on Jun. 8, 1998.
(60) Provisional application No. 60/052,207, filed on Jul. 10, 1997, provisional application No. 60/056,698, filed on Aug. 27, 1997, provisional application No. 60/063,272, filed on Oct. 27, 1997, and provisional application No. 60/066,913, filed on Nov. 28, 1997.

(51) Int. Cl.$^7$ ................................................. F26B 17/00
(52) U.S. Cl. ...................... 34/578; 34/75; 34/76; 34/86
(58) Field of Search ........................... 34/349, 519, 578, 34/75, 76, 80, 86, 90, 93; 110/203, 238, 243, 254; 159/2.1, 2.3, 4.02, 4.1; 60/39.01, 671, 676, 682, 683; 210/67, 68, 71

(56) References Cited

U.S. PATENT DOCUMENTS

| | | | |
|---|---|---|---|
| 3,926,129 | * | 12/1975 | Wall .................................... 201/31 X |
| 3,950,230 | * | 4/1976 | Greenfield et al. .................... 203/47 |
| 3,979,205 | * | 9/1976 | Wansenberg ........................ 423/22 X |
| 4,097,378 | * | 6/1978 | St. Clair .................................. 210/67 |
| 4,189,848 | * | 2/1980 | Ko et al. .............................. 34/93 X |
| 4,196,077 | * | 4/1980 | Berkowitz et al. ................. 210/22 R |
| 4,642,904 | * | 2/1987 | Smith, Jr. ............................. 34/86 X |
| 4,702,798 | * | 10/1987 | Bonanno ............................... 159/47.1 |
| 4,957,049 | * | 9/1990 | Strohmeyer, Jr. .................... 110/234 |
| 5,103,578 | * | 4/1992 | Rickard .................................... 34/92 |
| 5,111,596 | * | 5/1992 | Laurenty ........................... 34/169 X |
| 5,223,088 | * | 6/1993 | Hansen ................................. 159/2.1 |
| 5,230,167 | * | 7/1993 | Lahoda et al. .......................... 34/75 |
| 5,263,267 | * | 11/1993 | Buttner et al. ..................... 34/179 X |
| 5,783,084 | * | 7/1998 | Suekonis .............................. 210/638 |
| 5,987,776 | * | 11/1999 | Holcombe .............................. 34/330 |

\* cited by examiner

Primary Examiner—Stephen Gravini
(74) Attorney, Agent, or Firm—Carothers & Carothers

(57) ABSTRACT

This Document is a Continuation in Part of U.S. patent application Ser. No. 09/093,029 filed on Jun. 8, 1998, said invention comprising an apparatus for evaporating water in a mixture of water and solids derived from the organic output of a waste water treatment plant. A low cost source of gaseous heat (as the exhaust from a gas turbine driver in combination with/or alternatively from a stand alone combustor) is used for evaporating said water and safe conditioning said evaporated water vapor after being combined with a portion of the exhaust from said gaseous heat source. The solids portion of said organic output from said waste water treatment plant is segregated and safe conditioned separately.

This continuation in part filing supplements said basic reference patent filing by defining a specific heat exchange surface configuration for heat exchanger 17 which minimizes radiation heat losses to atmosphere. Also, incineration temperature has been reduced to minimize the cost of heat transfer surface relative to tube materials employed and high temperature volumetric requirements. Illustrative temperature differentials between heat transfer circuits have also been increased.

1 Claim, 2 Drawing Sheets

SEWAGE ORGANIC WASTE COMPACTION AND INCINERATION SYSTEM INTEGRATED OPTIONALLY WITH A GAS TURBINE POWER DRIVER EXHAUST AND/ OR OTHER SEPARATE HEAT SOURCE

This Application is a CIP of Ser. No. 09/093,029 filed Jun. 8, 1998. This case also claims benefit of Prov Applications 60/052,207, filed Jul. 10, 1997, 60/056,698 filed Aug. 27, 1997, 60/063,272 filed Oct. 27, 1997 and 60/066,913 filed Nov. 28, 1997.

BACKGROUND OF THE INVENTION

This invention relates to improved means for disposal of digested sewage organic wastes by means of de-watering and safe conditioning said organic wastes.

SUMMARY OF THE INVENTION

The safe conditioning process defined herein increases the number of disposal locations where it would be permissible to dump incinerated and dewatered sewage sludge end product.

Further objectives of this invention are:
To reduce composite cost of sludge disposal resulting from said integrated operations,
Minimize volume of the disposal material,
Speed up processing time,
Improve the measure of control which can be achieved during the processing period.
Uniformity of processed material,
Eliminate formation of objectionable odors during the sludge processing operation as well as after its deposition in land reclamation projects, the sludge safe conditioning process eliminating runoff of undesirable constituents into rivers and waterways in general.

Figure 1:
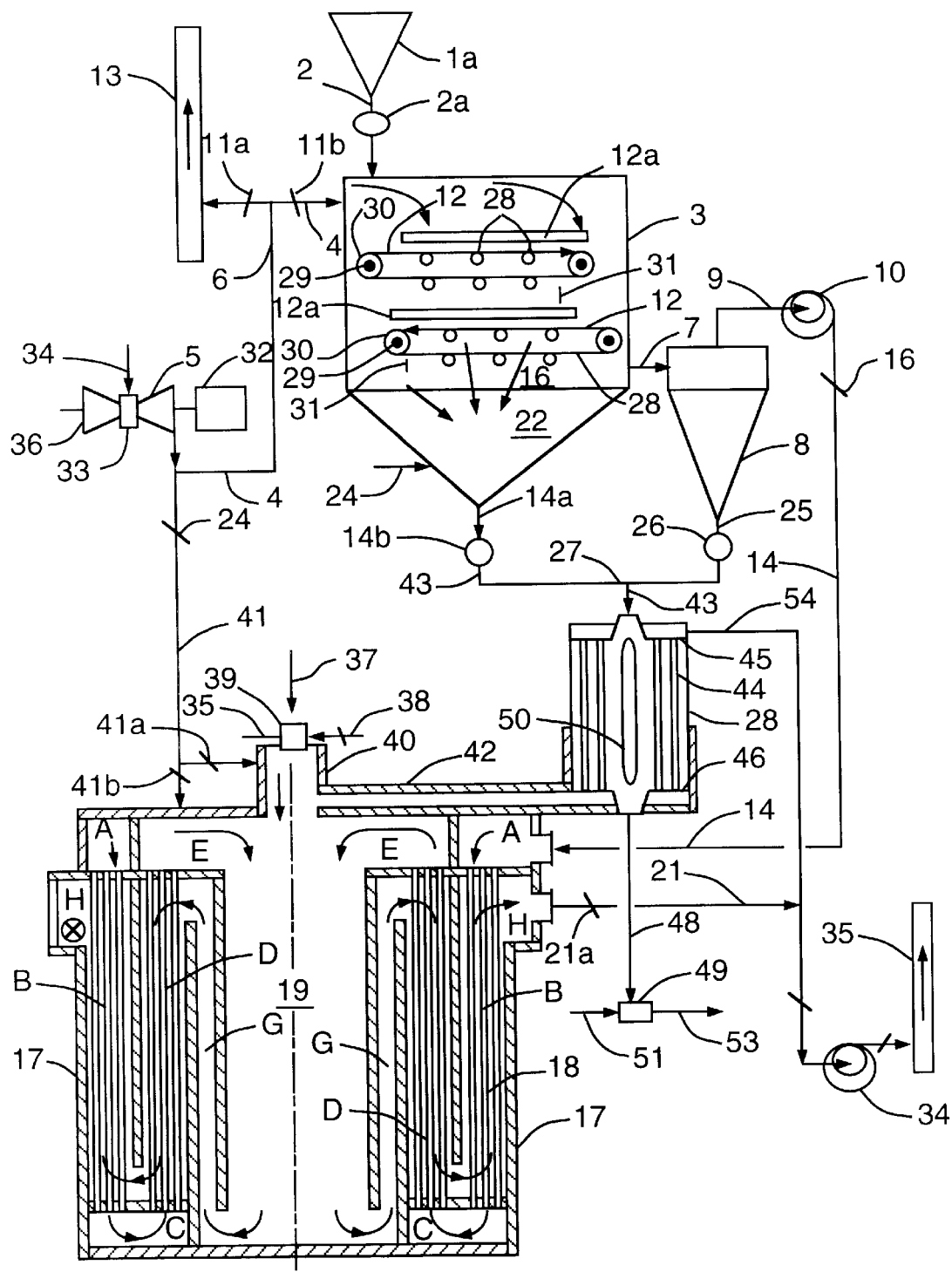
FIG. 1 is a sectional diagrammatic arrangement of the process covered by this invention. An optional gas turbine 5 for powering an energy consumer, as an electric generating plant, is depicted as being one economical source of low level heat supply for the sludge conditioning process. An alternative Higher Temperature output source of such heat supply in such case as combustor 40 would be required.

Stabilized sludge feed stock 1 (not shown) from hopper 1a, a material high in moisture content, is fed through conduit 2 and feeder 2a to dryer 3 continuous rotating chain link belts 12 which convey feed stock 1 horizontally across dryer 3 in direct contact with said hot gas input to said system.

Dryer 3 receives a stream of hot gas through conduit 4.

Said hot gas input flows down, over, around, and through dryer 3 continuous rotating chain link belts 12 to chamber 16 below, through conduit 7, to and through dust separator 8, discharging through conduit 9 to and through optional induced draft fan 10, through conduit 14 to and through gas incinerator heat exchanger 17 tubular heat exchange surface 18 which discharges to high temperature sludge vapor volume space 19, from which said gas discharges to the high temperature side of heat exchanger 17 surrounding the exterior of tubular heat exchange surfaces 18 facilitating heat transfer from the exterior of tubes 18 to fresh exhaust flow from dryer 3 entering the interior tube surface of heat exchanger 18, thereby minimizing the amount of heat energy required for incineration of dryer 3 discharge gas flow The heat exchanger surfaces 18 depict a two pass design whereby suitable tube materials can be employed which are suited for the gas temperatures of each pass of the two pass design illustrated in Drawing FIGS. 1 and 2.

Low level heat as from gas turbine 5 exhaust flow in conduit 4 is an economical source of heat for use in dryer 3. Combustor 40 provides a high level source of heat required for incineration and safe conditioning dry sludge solids in one apparatus and combustion gas and water vapor in separate apparatus component.

Combustor 40 can also be employed to preheat the overall apparatus prior to connecting said optional gas turbine exhaust flow directly to the sludge processing system or at times when said gas turbine is inoperative or its Btu heat output is inadequate to maintain sufficiently high temperatures in the gas and vapor flow stream downstream of said retention chamber 19 to assure that gas temperatures do not drop below saturation conditions.

Dust collected in separator 8 is discharged through conduit 25, feeder 26 and conduit 27 in series for incineration in solids incinerator 28.

Within dryer 3, sludge feed stock 1 is spread uniformly over rotating power driven continuous metal link belt/s 12 through and over which said hot gas flow stream mingles with feed stock 1 as the mixture flows horizontally and downward through dryer 3.

Belt/s 12 are supported by rollers 28. End pulleys 30 mounted on drive shafts 29 position belts 12. Drive shafts 29 are driven by motor/s (not shown).

Fixed bars 31 scrape loose sludge materials adhering to the underside of rotating belts 12.

Belts 12, rotate in the direction of the arrows at the conveyed material drop off point of the belt. The arrow/s indicate direction of belt rotation only and are not a physical part of belts 12.

During the drying process while traveling along on top of belts 12, said stabilized digested and compressed sludge feed stock 1 has a tendency to cake and agglomerate which reduces the heat transfer rate of the sludge material, delaying the moisture evaporation process.

In order to bring the moisture contained in the sludge feed stock more directly in contact with said hot exhaust gas, extended rake like frames 12a hung above belts 12 continuously break up and loosen the sludge material as it passes along over the tops of belts 12.

Frames 12a may be vibrated or rotated in a horizontal or horizontal/vertical pattern to screen and break down the particle sizes passing along through tines mounted on frame 12 grids increasing heat transfer effectiveness between said hot exhaust gas and said sludge feed stock 1 passing along on the top of belts 12.

Dry sludge which drops down from the end of belts 12 falls into hopper 22.

Fluidizing air through conduit 24 keeps material collected in hopper 22 loose and fluid.

Raw sludge moisture may normally be expected to be in a range of up to 76 percent.

Optional gas turbine 5 drives an optional power consumer as electric generator 32. Gas fuel is supplied to combustor 33 through conduit 34.

Compressor 36 supplies atmospheric air to combustor 33 under pressure. The products of combustion in combustor 33 exhaust directly to gas turbine 5. Gas inlet through conduit 34 provides the energy to power gas turbine 5.

Gas inlet through conduit 37 and supplemental air flow through conduit 38 to burner 39 in combustor 40 provide the booster heat required by heat exchangers 28 and 17 to safe condition the low temperature dry sludge collected in hopper 22 and the low temperature gas and water vapor exiting dryer 3 through conduit 7.

Ignitor 35 is used to light-off burner 39.

A portion of optional turbine 5 exhaust gas flow may be diverted to combustor 40 through conduit 41.

Damper 41a would normally be open to admit gas turbine exhaust flow directly into combustor 40. Damper 41b would normally be closed and only opened to admit gas turbine exhaust flow to retention chamber 19 to preheat the equipment during startup. In a case where gas turbine 5 is not included, gas flow from combustor 40 would pass directly to dryer 3 through the equivalent to conduits 41 and 4 to dryer 3 shell as depicted on FIG. 1

Auxiliary combustor 40 outlet gas is apportioned between solids safe conditioner 28 and vapor safe conditioner (18–19).

Safe conditioner 28 is of the indirect heat exchange type. Heat is exchanged through tubular surface between said gas which has been elevated in temperature by heat output from combustor 40 to a level sufficient to incinerate dried sludge. Volatile hazardous ingredients in the dry sludge collected in hopper 22 are so safe conditioned prior to discharge to the open environment.

The dried sludge product flowing to safe conditioner 28 from hopper 22 through conduit 14a, feeder 14b and conduit 43 is at or above 212 F. The dried material flows in and around tubes 44 which are contained in an insulated shell and are anchored in tube sheets 45 and 46.

Hot gas from combustor 40 passes through conduit 42 to incinerator 28 tube sheet head contained by incinerator 28 shell and tube sheet 46, upward through the inside of tubes 44 to the tube sheet head contained by incinerator 28 shell and tube sheet 45.

Conduit 43 extends through incinerator 28 shell and connects to tube sheet 45

Outlet conduit 48 of solids incinerator 28 is constructed similarly. Conduit 48 connects to educator 49

Item 50 is a spreader piece which causes the inflow of dry sludge feed stock to spread uniformly throughout the heat exchanger cross section and is constructed of appropriate high temperature material.

Fluidizing air through conduit 51 is jetted through educator 49 and provides the energy to transport incinerated sludge from heat exchanger 28 through conduits 48 and 53 to a protected storage and cooling area (not shown) where said incinerated sludge cools prior to final disposal.

The heat transfer tubular surfaces 18 within heat exchanger 17 are configured cylindrically around the core of the high temperature heat transfer zone, in a manner which insulates the high gas temperature zone from atmospheric temperatures surrounding heat exchanger 17 thereby minimizing heat losses to atmosphere.

Figure 2:
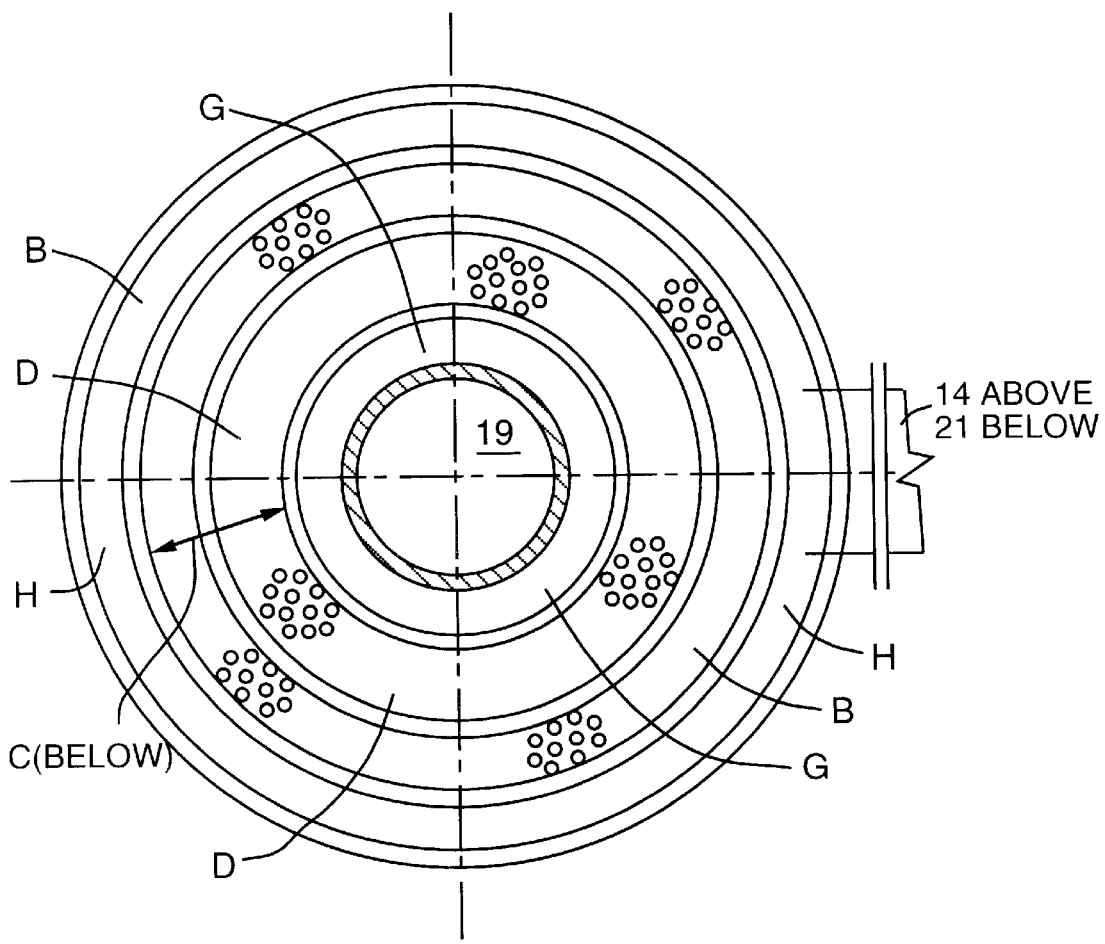

On FIG. 1 and FIG. 2 the lower temperature circuit enters heat exchanger 17 through conduit 14 to cylindrical plenum A from whence the inlet gas and water vapor flows through tubular circuits B to plenum C where flow is reversed as it enters tubular circuits D which discharge to plenum E which empties into vapor volume space 19 where said gas is thermally enriched by heat input from combustor 40. Gas flow from plenum E then flows through vapor volume space 19 and is reversed and transported through column G after which flow is again reversed in counter flow over the exterior of tubular surface D. Said counterflow gas is again reversed at the outlet of exterior tubular surface D and passed again in counter flow over the exterior of tubular surface B. At the inlet end of tubular surface B said exterior flow exits through plenum H, conduit 21 and damper 21A to induced draft fan 34. from whence it is discharged upward through stack 35 to atmosphere.

Table 1, which follows, is typical and representative of one sludge dryer processing plant application only.

TABLE 1

| Gas Turbine Rated Performance Data | |
|---|---:|
| Gas Turbine Exhaust Gas Flow, Lb/Sec | 44.40 |
| Gas Turbine Exhaust Gas Flow, MLb/Hr. | 159.84 |
| Gas Turbine Exhaust Gas Temp, F. | 997.00 |
| Gas Turbine Fuel Rate, Btu/kwhr | 11,223.00 |
| Gas Turb Electric Power Output (ISO), kwhr | 5,025.00 |
| Gas Turbine Fuel Consumption, MMBtu/Hr | 56.40 |
| Sludge Dryer Parameters | |
| Pressed Sludge Feed stock Moisture Content, % | 76.60 |
| Feed stock Moisture Heat of Vap, Btu/lb | 970.30 |
| Radiation Heat Losses, % | 5.00 |
| Sludge Feed Temp to Dryer, F. | 60.00 |
| Dry Sludge Specific Heat, Btu/lb/° F. | 0.18 |
| Gas Exhaust Temp from Sludge Solids Cond., F. | 260.00 |
| Dryer Sludge Solids Exit Temp., F. | 212.00 |
| Dryer Outlet Vapor Exit Temp, F. | 212.00 |
| Dryer Sludge Moisture Removal Eff, % | 99.8+ |
| Gas Exhaust Temp from Sludge Vapor Cond., F. | 365.00 |
| Performance Per Mlb/Hr GT Exh Gas Flow to Dryer | |
| GT Exh Flow to Dryer, Mlb/Hr (Calculation Variable) | 105.33 |
| GT Gas Temp to Dryer Inlet, F. | 997.00 |
| Ht Avail in Dryer to Evap Sludge Moisture, MMBtu/Hr | 21.23 |
| Ht Req. to Raise Sludge H2O Temp in Dryer, Btu/lb | 152.00 |
| Input to Dryer to Raise H2O Temp to Sat, MMBtu/Hr. | 3.16 |
| Ht Req to Raise Sludge Solids Temp in Dryer, Btu/lb. | 27.36 |
| Input to Dryer to Raise Solids Temp to Sat, MMBtu/Hr. | 0.17 |
| Sludge Moisture Vaporized in Dryer, Mlbs/hr | 20.78 |
| Dewatered Sludge Production Capacity, Mlb/Hr | 6.35 |
| Tons of Raw Sludge Processed, Tons/Hr | 13.56 |
| High Temp of Sludge Solids in Safe Conditioner, F. | 1,300.00 |
| Hot Aux Combstr Gas T to Sludge Solids Safe Condtnr, F. | 2,000.00 |
| Ht Input to Sludge Solids, Btu/lb Solids Flow | 187.20 |
| Tot Ht Input to Solids in Solids Safe Conditioner, MMBtu/Hr | 1.19 |
| Aux Combstr input to Solids Safe Conditioner, MMBtu/hr | 0.69 |
| GT Exh Flow to Solids Safe Cond., MMBtu/Hr | 0.50 |
| GT Exh Flow to Solids Safe Cond., Mlb/Hr | 0.64 |
| Outlet Vapor Temp from Vapor Safe Conditioner, F. | 1,300.00 |
| Inlet Hot Gas Temp to Vapor Safe Conditioner, F. | 2,000.00 |
| Flow from Aux Combstr to Retention Chamber, Mlb/Hr | 51.76 |
| Recycled Heat in Vapor Incinerator, MMBtu/Hr | 29.36 |
| GT/Aux Combstr Ht Input to Retention Chmbr, MMBtu/Hr | 10.67 |
| Aux Combstr Ht Input to Retention Chamber, MMBtu/Hr | 6.15 |
| Gas Turb Exhaust to Retention Chamber, MMBtu/Hr | 4.52 |
| Vapor Safe Conditioner Radiation Losses, Mlb/Hr | 2.11 |

DESCRIPTION OF PREFERRED EMBODIMENTS

Thus, it will be seen that I have created an efficient embodiment of my invention which overcomes past problems; namely, disposal of high moisture sewage organic sludge in land fills, without having been de-watered and incinerated (safe conditioned). Such past practice is not only costly, but can be hazardous to the environment as well as objectionable to residents living adjacent to said landfills. Also, the proposed sludge safe conditioning process increases the number of disposal locations where it would be permissible to dump said safe conditioned and dewatered sludge end product.

For the apparatus and systems described herein, a specific objective of this invention is to reduce composite cost of sludge disposal resulting from said integrated operations.

Further, said process overcomes:

a.) Problems related to dumping of concentrated sludge which has not received adequate primary treatment into permitted contained landfills close to populated areas, b.) Problems associated with the dumping of excessive amounts of bio-composted end product which leaches into local, state and national waterways to the detriment of means for controlling the degree of marine life concentrations therein.

c.) Problems associated with absence of means for rapid correction of faulty primary treatment.

Currently existing primary treatment systems are overloaded to a point where expenditures to correct the same result in greatly reduced benefits per unit of expenditure. Existing facilities have run out of expansion capability. Exacting control means is needed to produce a truly safe conditioned end product from a secondary treatment facility. Existing sludge treatment facilities cannot readily be expanded to satisfy ever increasing demands for new service hookups. Such corrective action requires a substantial reconstitution of existing processing facilities without any guaranteed promise for improved performance from the same.

While I have illustrated and described various embodiments of my invention, these are by way of illustration only and various changes and modifications may be made within the contemplation of my invention and within the scope of the following claims:

I claim:

1. The invention comprising an apparatus for evaporating water in a mixture of water and solids derived from the output of an organic waste waster treatment plant;

a source of hot intermediate temperature gas;

said intermediate temperature gaseous heat being employed for evaporating said water and preheating said solids;

a high level source of gaseous heat generated by a stand alone combustion apparatus firing a mixture of air and fuel to incinerate vapor and solids outputs;

said apparatus being configured to segregate said preheated solids from said evaporated water vapor and said gaseous heat;

conduit means to convey said segregated preheated solids to a first circuit in a first closed circuit heat exchanger;

conduit means to convey a portion of said high level gaseous heat at high temperature from said source of gaseous heat to a second circuit in said first closed circuit heat exchanger and in counter flow to said segregated solids flow, heat transfer from said second circuit to said first circuit of said first closed circuit heat exchanger raising temperature of said solids to a level which permits said solids to be deposited in approved areas;

conduit means to convey that portion or said gaseous heat, utilized for evaporating said water and preheating said solids after being combined with said evaporated water vapors, to a first circuit of a second closed circuit heat exchanger;

a plenum chamber connected to the outlet from said first circuit of said second closed circuit heat exchanger;

conduit means to convey a remaining portion of said gas flow from said stand alone combustion apparatus at peak temperature, to said plenum chamber wherein said remaining portion of said source of gaseous heat mixes with said outlet gas and vapors from said first circuit of said second closed circuit heat exchanger, raising temperature of said outlet gas and vapors from said first circuit of said second closed circuit heat exchanger to a safe conditioned state;

conduit means connected to an outlet from said plenum chamber to convey said mixture of gaseous heat and evaporated water vapors in said plenum chamber to a second circuit in said second closed circuit heat exchanger and in counter flow to said first circuit of said second closed circuit heat exchanger;

heat transfer from said second circuit of said second closed circuit heat exchanger to said first circuit of said second closed circuit heat exchanger raising temperature of said mixture of gaseous heat and evaporated water vapors in said first circuit of said second closed circuit heat exchanger, and lowering temperature of said mixture of gaseous heat and evaporated water vapors in said second circuit of said second closed circuit heat exchanger;

said mixture of gaseous heat and evaporated water vapors exiting from said second circuit being safely discharged to atmosphere;

said first and said second closed circuit heat exchanger circuits being configured radially so that said plenum chamber is located centrally in said second closed circuit heat exchanger, surrounded by heat transfer zones of relatively declining gas temperatures, said highest temperature heat exchange between said second circuit to said first circuit of said second closed circuit heat exchanger occurring adjacent to said plenum chamber, heat exchange temperatures between said second circuit to said first circuit of said second closed circuit heat exchanger diminishing as the distance of said circuits increases with respect to their location away from said plenum chamber, whereby temperatures at the radial outside perimeter of said second closed circuit heat exchanger are maintained at relatively lower temperature levels compared with said plenum chamber temperature levels.

* * * * *